(12) United States Patent
Zheludev et al.

(10) Patent No.: US 6,304,362 B1
(45) Date of Patent: Oct. 16, 2001

(54) APPARATUS PROVIDING VARIABLE REFLECTIVITY TO ELECTROMAGNETIC RADIATION

(75) Inventors: Nikolay Ivanovich Zheludev; David John Richardson, both of Southampton; Sukhminder Dhanjal, Reading, all of (GB)

(73) Assignee: University of Southampton, Southampton (GB)

( * ) Notice: Subject to any disclaimer, the term of this patent is extended or adjusted under 35 U.S.C. 154(b) by 0 days.

(21) Appl. No.: 09/554,176
(22) PCT Filed: May 1, 1998
(86) PCT No.: PCT/GB98/01284
  § 371 Date: Jul. 24, 2000
  § 102(e) Date: Jul. 24, 2000
(87) PCT Pub. No.: WO99/26106
  PCT Pub. Date: May 27, 1999

(30) Foreign Application Priority Data

Nov. 14, 1997 (GB) .................................................. 9724150

(51) Int. Cl.⁷ ................................. G02F 1/03; G02F 1/07
(52) U.S. Cl. ............................................................. 359/241
(58) Field of Search ................................... 359/240, 241, 359/248

(56) References Cited

U.S. PATENT DOCUMENTS

| | | | |
|---|---|---|---|
| 3,584,934 | * 6/1971 | French | 359/241 |
| 3,834,793 | 9/1974 | McConnell et al. | 359/289 |
| 4,283,113 | 8/1981 | Eden | 350/96.15 |
| 5,608,568 | 3/1997 | Blodgett et al. | 359/288 |

FOREIGN PATENT DOCUMENTS 195 28 094    2/1997 (DE) .
2 303 937    3/1997 (GB) .

OTHER PUBLICATIONS

"Optical Bistability: Controlling Light with", by Hyatt M. Gibbs, published Academic Press, Inc., 1985; 17 pages.

"Linear and Non–Linear Optics of Condensed Matter", by T.P. McLean, published in Interaction of Radiation with Condensed Matter, vol. 1, published by International Atomic Energy Agency, Vienna 1997; pp. 3–32.

"Q Switching of a resonator by the metal–semiconductor phase transition", by A.A. Bugaev et al., Sov.J.Quantu Electron. II (Dec. 12, 1981); pp. 1638–1639.

"Self–mode–locking produced when a mirror which undergoes a metal semiconductor phase transition is used as the modulator"by A.A. Bugaev et al; JETP Let, vol. 33, No. 12, Jun. 20, 1981; pp. 629–632.

"Selectivity of the photoexcited metal–semiconductor phase transition in vanadium dioxide initiated by piocosecond pulses", by A.A. Bugaev et al., JETP Let, vol. 34, No. 8, Oct. 20, 1981; pp. 430–433.

(List continued on next page.)

Primary Examiner—Ricky Mack
(74) Attorney, Agent, or Firm—Westman, Champlin & Kelly, P.A.

(57) ABSTRACT

An optically responsive variable reflecting surface uses a body of gallium held at a temperature slightly below its bulk melting point. Irradiation of the surface with optical energy produces substantial changes in surface reflectance. Devices employing gallium may be used for switching optical waveguides and in control of lasers.

30 Claims, 9 Drawing Sheets

OTHER PUBLICATIONS

"Ultrafast Nonlinearity of Metallic Indium Across the Liquid–Solid Transition"; by Zheludev et al., published by Springer; Ultra Fast Phenomena X, Proceedings of the Tenth International Conference, May 28th to Jun. 1st 1996; p. 461.

"Giant nonlinearity and reflectivity hystersis in metallic gallium at melting", Proceedings of the 1997 Conference on Quantum Electronics and Laser Science (QELS) in Baltimore; S. Dhanjal et al., May 18–23, 1997 pp. 223–224.

"Time–resolved second–harmonic study of femtosecond laser–induced disordering of GaAs surfaces", Optics Letters; S.V. Govorkov et al., Vo. 16, No. 13, Jul. 1, 1991, pp. 1013–1015.

"Shallow melting of thin heavily doped silicon layers by pulsed $CO_2$ laser irradiation", Journal of Applied Physics; R.B. James, W.H. Christie, vol. 65, No. 9, May 1, 1989, pp. 3655–3661.

* cited by examiner

APPARATUS PROVIDING VARIABLE REFLECTIVITY TO ELECTROMAGNETIC RADIATION

The present invention relates to apparatus providing variable reflectivity to electromagnetic radiation, particularly at an interface between a body of predetermined material and a transparent region, where the interface provides a broad band reflecting surface externally to the body of material. In the context of this specification, the term "broad band reflecting surface" should be understood to mean a single surface which by itself reflects light specularly over at least one octave of optical wavelengths.

Variable reflection coefficients can be described theoretically as a result of optical non-linearity in the predetermined material, and more particularly as a non-linearity in at least one component of the dielectric tensor of the material.

The dielectric tensor is a multi dimensional expression defining how an electromagnetic radiation field propagates in and interacts with a medium. In the simple case of a so called Linear, Isotropic, Homogeneous (LIH) medium, the dielectric tensor reduces to the dielectric coefficient of the medium. However, to cover non LIH, and non-linear media, the tensor includes several components which may be functions of external excitation, in particular electromagnetic radiation. The dependence of the dielectric tensor on electromagnetic radiation is usually introduced by a multi dimensional expression using optical nonlinearity which relates the electromagnetic radiation fields with corresponding changes in the components of the dielectric tensor. From a knowledge of the dielectric tensor and its dependence on external stimulations the resulting change in phase, amplitude and polarisation of electromagnetic radiation interacting with a medium can be calculated both in terms of self induced changes and how the radiation effects the response of the medium to other optical beams of different polarisations, wavelengths and directions of propagation.

For further background information on the dielectric tensor and optical nonlinearities, reference may be made to "Electrodynamics of Continuous Media" by L. D. Landau, E. M. Lifshitz and L. P. Pitaevskii, chapters XI, XII, XIII published by Pergamon Press in 1984, "Nonlinear Optics" by R. Boyd, published by Academic, Press in 1992 and to "Linear and Non-Linear optics of Condensed Matter" by T. P. McLean published in Interaction of Radiation with Condensed Matter, Volume 1, published by International Atomic Energy Agency, Vienna 1997.

It has been proposed to use media exhibiting optical non-linearity in various devices in the field of optoelectronics. With continuing growth in the use of optical fibre communications, there is a continuing and increasing need for optical devices which can provide some of the functions of electronics using only optical signals. Various devices allowing the control of light with light are described in "Optical Bistability: Controlling Light with Light" by Hyatt M. Gibbs, published Academic Press Inc., 1985. All the devices described employ non-linear effects in transmission of light through a medium, particularly coefficients of absorption and refraction which depend on the applied light intensity. The use of optical nonlinearity within some form of optical interferometer is usually required to achieve a noticeable control of one light beam with another. In particular devices are described comprising of nonlinear materials used to fill the space in a Fabry-Perot resonator. When the resonator is tuned to an applied light wavelength, an optically bistable device can result. Other forms of interferometric switch are also possible. These include schemes based on nonlinear polarisation effects (i.e. Kerr gates), Sagnac and Mach-Zehnder interferometers. Most frequently these schemes are based on optical fibres, which due to the low nonlinearity of the fibres need to be physically long, and therefore are difficult to integrate into a small volume. They are also environmentally sensitive which severely limits their practical application. For more details see 'Nonlinear fiber optics' by G. P. Agrawal published by Academic Press in 1989. In all these schemes there is a difficulty in identifying suitable materials capable of providing the desired non-linear effects with response times, light power levels, operating optical bandwidth and associated optical losses at levels suitable for practical application.

Non-linear materials which show considerable optical nonlinearity are known. For example, liquid crystals and photochromic materials can also exhibit substantial nonlinearity. However the changes are relatively slow, of the order of 10 mSec or more.

Generally, no purely optical switching or control devices have yet been described which have found widespread commercial application. To succeed commercially, such devices would have to be small, fast and cheap, operate with low applied energy, be fully integrable with waveguide technology and preferably operate at or near room temperature.

As mentioned above, existing proposals for potentially practical optical switching or control devices have all been based on non-linear effects exhibited in transmission through essentially optically transparent media.

Metal-semiconductor phase transitions are known in a group of compounds of transition and rare-earth metals. Most attention has been directed at vanadium oxide which exhibits a change in solid phase from a semiconductor type to a metallic type at a transition temperature of about 67° C.

U.S. Pat. No. 4,283,113 discloses a device for optical switching using a vanadium oxide thin film on a transparent substrate. Films of thickness from 0.5 to 1 micron on a sapphire substrate are disclosed. Switching is accomplished by heating or cooling the device through the temperature of the phase transition. It is said that a transmission to reflection ratio of between 1 to 1,000 and 1 to 10,000 can be obtained at optical wavelengths of 10 microns.

Other devices employing vanadium oxide for temperature dependent optical effects are disclosed in U.S. Pat. Nos. 3,834,793 and Pat. No. 5,608,568.

The use of a film of vanadium oxide for Q-switching a laser resonator is disclosed in "Q-Switching of a Resonator by the Metal-Semiconductor Phase Transition", A. A. Bugaev et al., Sov.J.Quantu Electron. II (Dec. 12, 1981) pp 1638–1639. An interference reflective structure is disclosed comprising a film of vanadium oxide deposited on a mirror with 100% reflection coefficient. It is reported that laser pulses induce a phase transition in the vanadium oxide film of the structure, so that use of the structure as one mirror of a resonator results in Q-switching.

Similar reflective structures are also disclosed in (a) "Self-Mode-Locking produced when a Mirror which undergoes a Metal-Semiconductor Phase Transition is used as the Modulator", A. A. Bugaev et. al.; JETP Let, Vol.33, No. 12, Jun. 20, 1981, pp 629–632; and (b) "Sensitivity of Photo-excited Metal-Semiconductor Phase Transition in Vanadium Dioxide initiated by picosecond Pulses", A. A. Bugaev et. al., JETP Let, Vol. 34, No. 8, Oct. 20, 1981, pp 430–433.

Optical non-linearity can also be exhibited by essentially optically opaque media. In such cases, the optical non-linearity is exhibited in the electromagnetic radiation reflected from a surface of the medium. At present nonlinear optical properties of opaque media are considerably less studied then those of transparent materials. Although non-linear reflective effects are known in nonlinear optics, no suitable nonlinear material has been identified so far to insure their use in practical devices.

A very fast non-linear effect in reflected light has been reported in "Ultra Fast Non-Linearity of Metallic Indium Across the Liquid-Solid Transition", by Zheludev et al, Ultra Fast Phenomena X, Proceedings of the Tenth International Conference, Del Coronado, Calif., May 28 to Jun. 1, 1996, page 461, published by Springer.

In this article, the cubic optical non-linearity of metallic indium was observed either side of melting point. The observations were made by measuring the Specular Inverse Faraday Effect. Background information on this novel spectroscopic technique may be found in the article entitled Pump-Probe polarization-sensitive Nonlinear Optics by S. V. Popov, Y. P. Svirko and N. I. Zheludev published in Journal of Optical Society of America volume B13, page 2729 in 1996. The amount of polarisation rotation of a probe beam on reflection from a surface of the indium metal was monitored for various applied "pump" beam intensities.

The paper reports a substantial increase in the observed polarisation rotation, and therefore in the optical nonlinearity, at temperatures just below the melting point of indium. The paper reports values for the cubic optical non-linearity reaching a peak of $6\times10^{-8}$ esu ($8\times10^{-16}$ $V^{-2}m^2$). This would convert to an absolute change in a component of the dielectric tensor of approximately $8\times10^{-2}$ in response to a radiation field of 1 $GW/cm^2$. Since the modulus of the dielectric coefficient for indium (assuming isotropy) at applied wavelengths in the range 1.2 to 1.6$\mu$ is about 100, the above absolute change represents about 0.1% change in the modulus of the dielectric coefficient.

Thus, the observed non-linearity in indium as disclosed in the above paper is far too small to suggest any useful applications in optical switching or control systems. Generally, there has been no suggestion in the art that useful optical non-linearity over relatively short durations (<1 mS) can be found in the processes involved in the reflection of electromagnetic energy at an interface between a relatively opaque material and a transparent region.

However, the inventors have made the surprising discovery that materials do exist which exhibit broadband reflective optical non-linearities of sufficient magnitude to be of more than mere academic interest, but giving rise to the possibility of practical devices for controlling or switching light using only optical control signals.

The inventors have discovered that gallium, when held at a temperature just below its melting point, exhibits an extremely large optical non-linearity in light reflected externally at an interface between the gallium and a transparent region. The effect is such that the application of optical power of only a few mW to a spot of a few microns diameter on the surface of the gallium, causes a reversible change in the reflected light intensity by as much as 30% or a shift in the reflection coefficient from 50% (0.5) to about 65% (0.65). Values for changes in the coefficient of reflection as used herein are specified in terms of the change in absolute value of reflection coefficient, so that for example a change from a reflection coefficient of 0.5 to a coefficient of 0.65 is referred to as a change of 0.15 (or 15%). Note that the associated changes in dielectric tensor components could also manifest themselves as changes in phase and polarization of the wave interacting with the said interface.

The above change in reflection coefficient would convert to an absolute change in a component of the dielectric tensor of just less than 20 in response to a radiation field of approximately 5 $kW/cm^2$. Since the modulus of the dielectric coefficient for gallium (assuming isotropy) at applied wavelengths in the range 1.2 to 1.6$\mu$ is about 20, the above change represents about 100%. If these changes where purely due to cubic optical nonlinearity, the magnitude of the nonlinearity would be approximately 1 esu ($1.4\times10^{-8}$ $V^{-2}m^2$). Note the short penetration length of light into the material which is approximately 1/20 of the wavelength.

By comparison, at similar intensities of 5 $kW/cm^2$, indium would show an absolute change in a component of the dielectric tensor of approximately $10^{-6}$, which represents a change of only 0.000001%.

Before now, such strong nonlinearities as in gallium have only been seen in semiconductors, in particular near narrow exciting absorption lines, and in particular in GaAs based multiple quantum well structures. However, semiconductor materials only exhibit such strong nonlinearity within a very narrow spectral band, typically of around 1nm for the case of GaAs based multiple quantum wells structures, and often require cooling of the sample to temperatures of several Kelvin. Information on optical nonlinearities in semiconductors may be found in "Optical Bistability: Controlling Light with Light" by Hyatt M. Gibbs, published Academic Press Inc., 1985.

The discovery by the inventors of the existence of such gross changes in coefficient of reflection, corresponding to gross changes in a component of the dielectric tensor of the material forming the reflecting surface, for the first time opens up the possibility of broadband optical devices using non-linear reflection.

Accordingly, the present invention contemplates apparatus providing variable reflectivity to electromagnetic radiation, comprising a region which is transparent to the radiation, and a solid body of predetermined inorganic material forming an interface with said transparent region to provide a broad band external reflecting surface, said predetermined material exhibiting optical non-linearity at least at a predetermined temperature close to the melting point of the material, wherein said predetermined material exhibits in said radiation reflected by said surface a change of not less than 0.001% in at least one component of the dielectric tensor of the material when exposed to electromagnetic radiation of intensity of 5 $kW/cm^2$ delivered for a period less than 1 ms, the initial value of said component being restored within 1 ms of termination of electromagnetic excitation.

The term "solid", as used above and herein, is intended to include all states, intermediate phases, or combinations of states or phases of the body, other than the fully molten bulk state.

Preferably, the exhibited change in at least one component of the dielectric tensor is greater than 0.1%, more preferably not less than 1%.

Thus, the present invention is characterised by the use for providing variable external reflection of an inorganic material close to its melting point having the stated degree of non-linearity in a component of the dielectric tensor of the material, in combination with the stated restoration time following withdrawal of the stimulating electric field. Using a material which exhibits this level of optical nonlinearity in externally reflected radiation enables the construction of useful devices for controlling light signals. Because the effect of the optical nonlinearity on the reflected radiation is an optically broad band effect, devices employing the above described material may also be broad band devices. However, devices may also be made which are confined to narrow band, or monochromatic, operation, e.g. by inclusion of spectral filtering elements such as Bragg gratings or dielectric filters. Also, because the effect of the optical non-linearity of the material is exhibited in radiation reflected at an interface between a surface of the material and a transparent region, devices making use of the material can be made very thin. By comparison, non-linear transmission waveguide devices known in the art require a substantial thickness of the non-linear material for a useful effect on transmitted radiation to be achieved.

The physical mechanism behind this surprisingly large optical non-linearity is currently not completely understood. Simple bulk melting due to light-induced heating appears to be excluded, because gallium shows supercooling on solidification and therefore any reflectivity change would be irreversible even when the light is withdrawn. There is evidence that the nonlinearity is due to a light-induced structural phase transition from the 'ground state' α-gallium phase to some other more metallic, metastable phase or even molten state of higher reflectivity which relaxes back to the α-gallium phase once the optical stimulation is removed. It is believed that the reflectivity of the surface depends on the depth of the layer of higher reflective phase gallium. The phase change may occur over the stimulated surface unevenly, so that there is a mixture of the new phase and the previous phase over the surface.

The apparatus may include a temperature controller to hold said body at said predetermined temperature. The predetermined temperature will normally be a temperature a few degrees below the melting point of the material, typically not more than 25° below the melting point, and preferably within 5°, more preferably 2°; of the melting point. In preferred arrangements, the body is held by the temperature controller at about 1.5° below the melting point of the material.

Normally, the apparatus includes means to stimulate said material at said interface to effect a reversible change in a component of the dielectric tensor of the material at said predetermined temperature. In devices arranged for controlling light with light, for example, stimulation is provided by directing light of a required intensity at the interface.

The reversible change in the component of the dielectric tensor seen in gallium may in some conditions be considered as a function not of intensity, but of the total dose of the electromagnetic radiation incident per unit area on the reflecting surface defined by the interface. If light is focussed to a spot on the reflecting surface, the required reversible change in dielectric tensor occurs only in the spot where the received intensity or dose per unit area is sufficiently high.

Most usefully, the change in dielectric tensor component exhibited by the predetermined material is such as to cause the material to exhibit a change in coefficient of reflection at said interface of not less than 0.01 (1%) in response to an applied electromagnetic radiation of intensity 5 kW/cm$^2$. More preferably, the material exhibits a change in coefficient reflection at said interface of not less than 0.05 (5%) in response to electromagnetic radiation of 5 kW/cm$^2$.

Preferably said predetermined material is selected from metallic gallium, amorphous gallium, dielectric and semiconductor host materials doped with gallium microparticles, clusters of gallium on solid surfaces, gallium alloys and multi-layered structures with other materials, gallium doped with other chemical elements, bismuth, cadmium, antimony, selenium, mercury, lead, tin, zinc, and alloys and compositions containing at least one of gallium, mercury, bismuth, cadmium, antimony, selenium, lead, tin, indium, zinc, germanium, manganese, nickel, and having a melting point or structural phase transition below 400° C.

Preferred alloys of gallium include indium and/or germanium and/or nickel and/or manganese and/or zinc.

With 99.999% pure gallium, light-induced changes in reflected light intensity of up to 0.3 (30%) have been observed in response to stimulation with electromagnetic radiation of intensity 5 kW/cm$^2$.

The transparent region of the apparatus could be formed by a gas, but preferably comprises a non gaseous substance forming the interface with said body. In some embodiments, the transparent region comprises a layer of the transparent substance, for example a sheet of glass. In other embodiments, the transparent region may comprise an end portion of an optical fibre or waveguide having an end face forming said interface. In other embodiments, the transparent region comprises an optical waveguide having a sidewall, or internal surface, forming said interface.

The apparatus may also include a second reflecting surface located to form, with said broad band reflecting surface, an optical resonator or interferometer.

As will be explained later herein, the above construction as a resonator or interferometer can be used to provide a device exhibiting optical bi-stability. The construction may also be used to provide increased contrast in the variation of intensity of reflected light dependent on the reflection coefficient of the broad band reflecting surface, or to achieve a change of reflectivity around a predetermined level imposed by the second mirror.

However, it will also be understood that incorporating the broad band reflecting surface in a resonator or interferometer limits the applications of the resulting device to the wavelength or wavelengths to which the device has been tuned.

Optical bi-stability may also be provided by an embodiment of the apparatus including (a) a circulator device having at least first and second ports, and adapted to direct electromagnetic radiation received at the first port for reflection in said broad band reflecting surface and to direct electromagnetic radiation reflected in said surface for transmission from the second port, (b) a feedback transmission path feeding radiation transmitted from the second port back to the first port, (c) an input coupler for coupling input electromagnetic radiation into said first port, and (d) an output coupler for coupling output electromagnetic radiation from the second port.

The above apparatus also operates at wavelengths of electromagnetic radiation to which the optical circulator and the feedback transmission path have been tuned.

The apparatus providing variable reflectivity as described above may be used as a mirror defining the resonant cavity of a laser. Then the variable reflectivity may provide Q-switching or mode locking regimes of the laser, or stabilization of the output characteristics of the laser.

In a further embodiment, the apparatus may include a coupler adapted for coupling to a common portion at least of said broad band reflecting surface (a) a control source of electromagnetic radiation for controlling changes in the coefficient of reflection of said surface resulting from changes in a component of the dielectric tensor of said predetermined material due to the electric field of said control source, and (b) a signal source of electromagnetic radiation, (c) said coupler being adapted also for receiving electromagnetic radiation from said signal source reflected by said common portion of said surface.

A construction of this kind makes use of the varying reflectivity of the broad band reflecting surface for directly modulating the intensity of the signal source as reflected in the surface, in response to the intensity of the control source applied to the surface.

The apparatus described above with controllable reflectivity may be used over a wide range of wavelengths of electromagnetic radiation, including infra-red, visible and ultra violet light, as well as longer wavelengths extending to radio frequencies and shorter wavelengths extending to soft X-rays. References herein to "light" and "light beams" should be understood in this context as potentially embracing such longer and shorter wavelengths.

Examples of the invention will now be described with reference to the accompanying drawings.

Figure 1:
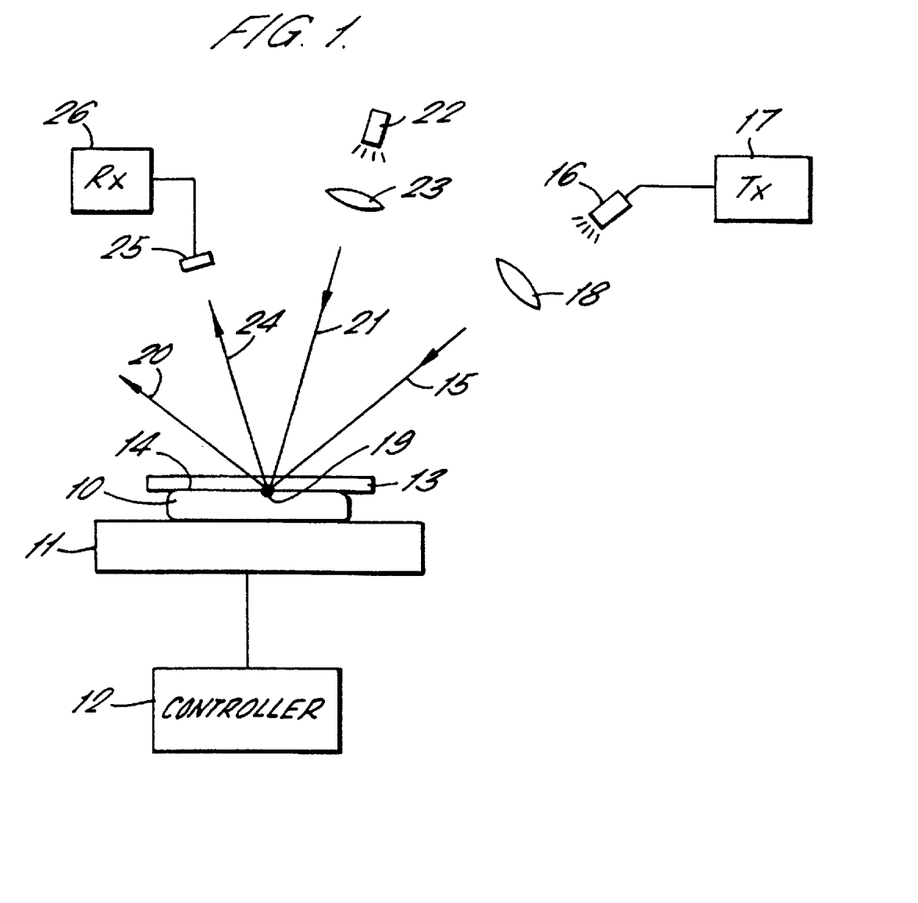
FIG. 1 is a schematic illustration of an embodiment of the invention.

Referring to FIG. 1, a body 10 of 99.999% pure gallium is located on a plate 11 which is controlled by means of the controller 12 to maintain a desired temperature to high accuracy. The temperature of the plate 11 may be controlled using an actively stabilised miniature Peltier heat pump. The body 10 of gallium is located under a sheet 13 of transparent glass. The body 10 of gallium thus forms an interface with the sheet 13 of glass providing an externally reflecting surface 14.

A control beam 15 of light (hereinafter called a pump beam) is derived from a light emitter 16 controlled by a transmitter 17. The beam 15 may be focused by appropriate optics illustrated generally by the lens 18.

The pump beam 15 illuminates a spot 19 of the reflecting surface 14 and a proportion of the illuminating beam is reflected from the surface in the reflected beam 20. A second light beam 21, here referred to as the probe beam, is derived from a further light emitter 22. The beam 21 may be focused to the spot 19 on the reflecting surface 14 by means of optics illustrated generally by the lens 23. A proportion of the probe beam is reflected in a signal beam 24, for detection by a photo detector 25 feeding a corresponding electrical signal to a receiver 26.

In order to demonstrate variable reflectivity in accordance with an embodiment of the invention, the controller 12 is arranged to hold the control plate 11, and hence the body 10 of gallium, at a temperature just below the melting point of gallium. The coefficient of reflection of the spot 19 of the reflecting surface 14 which receives the pump beam 15, can then be monitored by comparing the intensities of the probe beam 21 and the signal beam 24. It has been discovered that substantial changes in reflectivity occur depending on the intensity, in steady state, of the pump beam 15.

Figure 2:
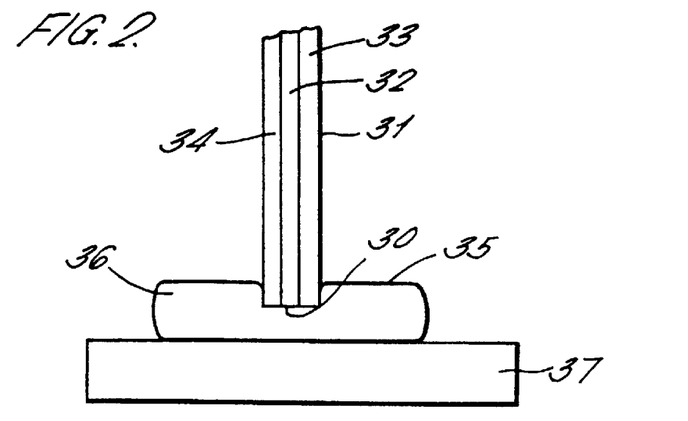
FIG. 2 is a schematic illustration of a modified embodiment of the invention employing an optical fibre to form the reflecting interface.

FIG. 2 illustrates a preferred embodiment in which the interface between a transparent region and the body of gallium is formed by the end face 30 of an optical fibre 31. The optical fibre 31 is formed in a manner known in the art with a central core 32 forming the optical waveguide region and an outer clading 33, so that light is confined to the optical waveguide region 32 by total internal reflection at the boundary 34 between the core 32 and the clading 33.

In the construction of FIG. 2, a freshly cleaved end of the optical fibre 31 is pressed slightly beneath an outer surface 35 of a bead 36 of gallium, whilst the gallium is heated to above its melting point by a temperature controlled heating plate 37. The temperature of the gallium bead 36 is then reduced again to refreeze the gallium with the optical fibre 31 inserted as shown.

There is thus formed an interface between the transparent core region 32 of the optical fibre and the bead 36 of gallium, at the end face 30 of the core 32.

In operation of the embodiment of FIG. 2, the temperature control plate 37 is maintained at a selected temperature (between 0.5 and 5°) below the melting point of gallium, so that there is no bulk melting of the gallium bead 36. Light energy is then delivered to the interface 30 along the optical fibre 31. A very substantial non-linearity in the coefficient of reflection at the interface 30 is observed, dependent in the steady state on the power density of the light delivered to the interface 30.

Figure 3:
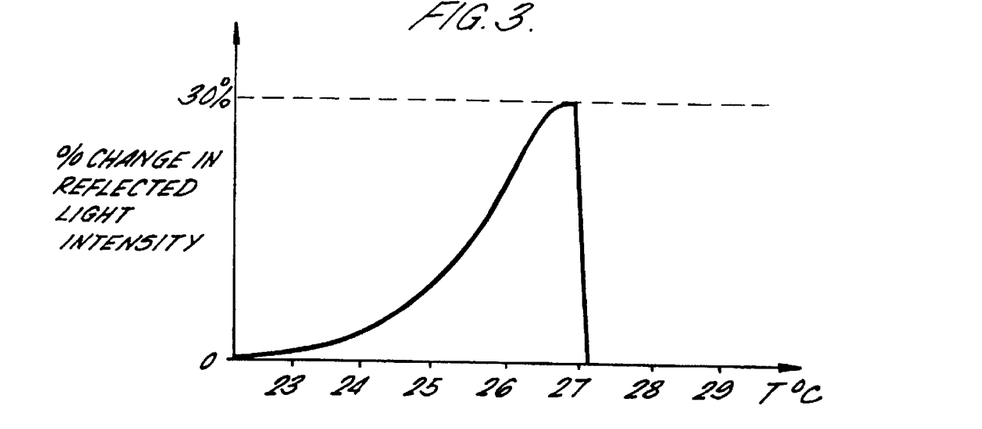
FIG. 3 is a graphical illustration of the percentage change in reflected light intensity for gallium at various temperatures below the melting point, when exposed to a specified light intensity.

For metallic gallium, FIG. 3 illustrates the change in coefficient of reflection observed with light intensity of 5 kW/cm$^2$, for different control temperatures of the gallium just below its melting point. As can be seen, the change in reflection coefficient rises to about 0.15 (15%) at temperatures just below the melting point. In the experiment, the 99.999% pure gallium used was found to melt at about 28° C. The intensity of 5 kW/cm$^2$ was provided by a source of light of 5 mW, delivered to an area of 100 square microns.

It should be noted that α-phase gallium is anisotropic, and polarisation of the light which is to be modulated by changes in reflection coefficient at the gallium surface is preferably adjusted to give minimum reflectivity for gallium in the solid phase.

Whereas experiments have clearly shown that the coefficient of reflection at the surface of gallium held at a temperature just below melting shows very significant changes with the power density of light being delivered to the reflecting surface, observations have also indicated a definite response time between the initial application of a defined power density of light, and the coefficient of reflection stabilising at a new value. For practical devices, it is important that the reaction time of any observed change in coefficient of reflection is sufficiently short. If the exposure of the gallium interface with the above described light intensity was continued for more than 2 $\mu$Sec, little further increase in the change in reflection coefficient was observed. However exposure times of less than 2 $\mu$Sec provided a corresponding reduction in the change in reflection coefficient.

Figure 4:
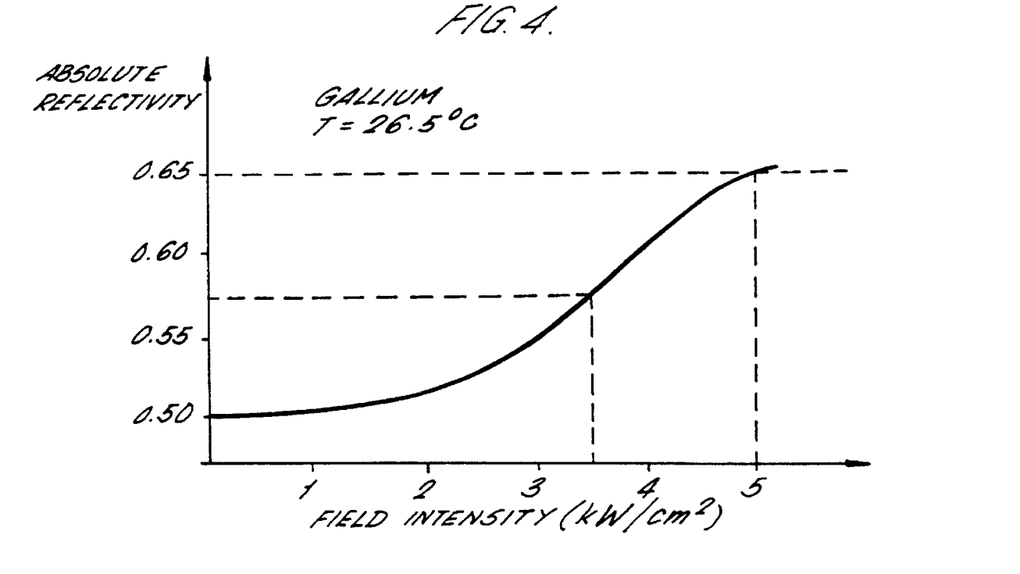
FIG. 4 is a graphical illustration of the variation in reflection coefficient of gallium at 26.5° C. for various light intensities.

FIG. 4 illustrates the actual reflection coefficient of metallic gallium held at a temperature of 26.5° C., for various intensities of light energy. As can be seen, the reflection coefficient of gallium changes from 0.5 (50%) for zero or low intensities of incident light up to a maximum of about 0.65 (65%) for intensities of about 5 kW/cm$^2$. Thus, the dynamic range for the coefficient of reflection of gallium is about 0.15 (15%).

Figure 5:
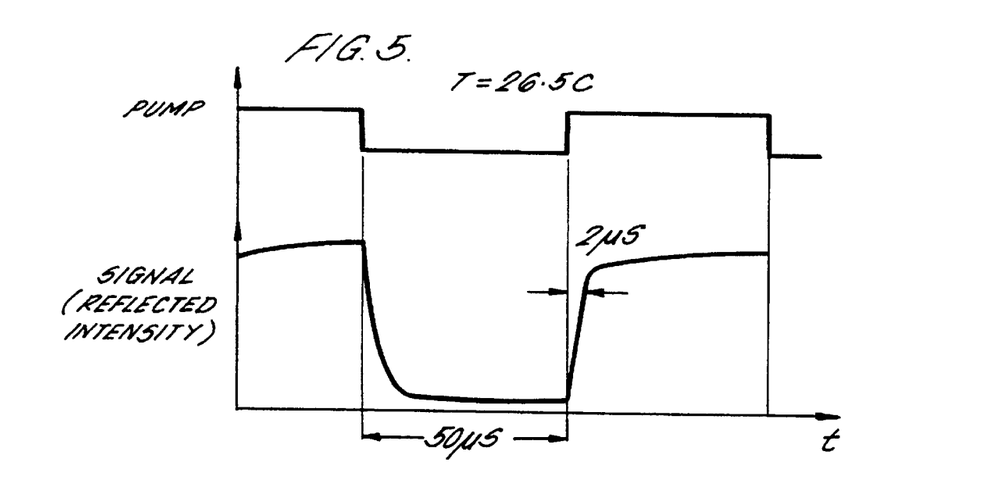
FIG. 5 is a graphical illustration of the reflected light intensity in response to a modulated pump signal, employing the embodiments of FIGS. 1 or 2.

FIG. 5 illustrates how the change in reflection coefficient may be used to modulate the intensity of a light signal, in response to an applied pump beam. Referring to FIG. 1, transmitter 17 is arranged to modulate the intensity of the pump beam 15, effectively turning the source 16 on and off to provide a repetition rate of about 10 kHz. The signal beam 24 is then monitored and is found to vary in intensity as illustrated in FIG. 5. The intensity variation corresponds to the change in reflection coefficient of the illuminated spot 19 of the body of gallium, and may be of the order of 30%.

Although reference has been made to FIG. 1, in fact the arrangement of FIG. 2 is preferably used for modulating a signal beam as described above. Both the preferred beam and the pump beam are supplied along the optical fibre 31 to the interface 30 and the reflected signal beam is separated from other reflections by arrangements such as shown in FIG. 8 which will be described later herein.

Figure 6:
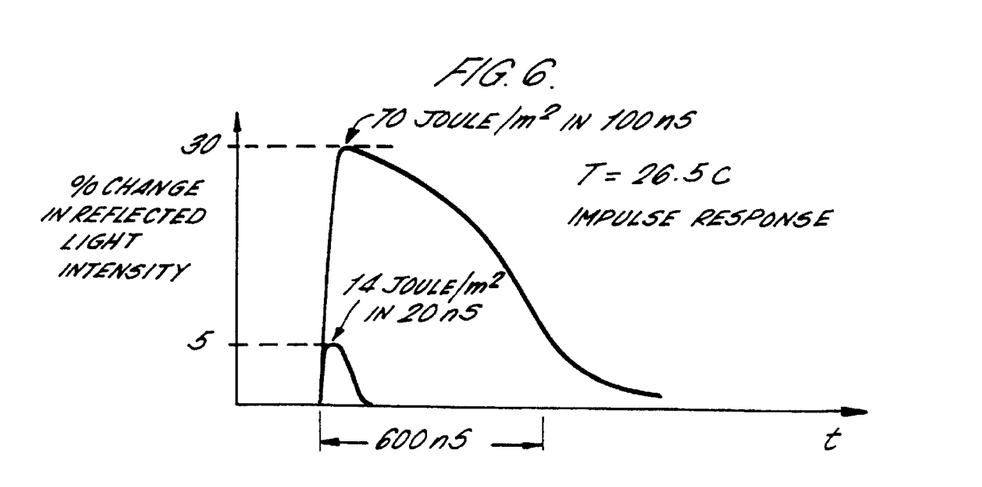
FIG. 6 is a graphical representation of the percentage changes in reflected light intensity to an applied light impulse of various doses.

FIG. 6 illustrates the impulse response of the change in reflection coefficient. It is considered that in this particular case the non-linearity of the material is best illustrated by reference to the dose of energy per unit area, so long as the maximum dose duration corresponds to the time within which the change in reflection coefficient of the material reaches a maximum (saturation) level in response to delivery of a maximum power per unit area of light. As illustrated, the leading edge of the reflection coefficient response appears to be relatively linear. The various doses for the impulse response test were delivered by applying a light pulse of constant power density (about 70 kW/cm$^2$) for various periods of time. A dose of 70 Joule/m$^2$ was delivered by applying the above light power density for a period of 100 nsec. The indicated dose of 14 Joules/m$^2$ was delivered as the above power density for 20 nsec. From FIG. 6, it can be seen that the time for the reflection coefficient to be restored to its initial value after termination of the stimulating pulse is dependent on the total dose of energy delivered in the pulse. The restoration time for an energy dose of 70 Joule/m$^2$ delivered in 100 ns is of the order of 600 nsec.

Figure 7:
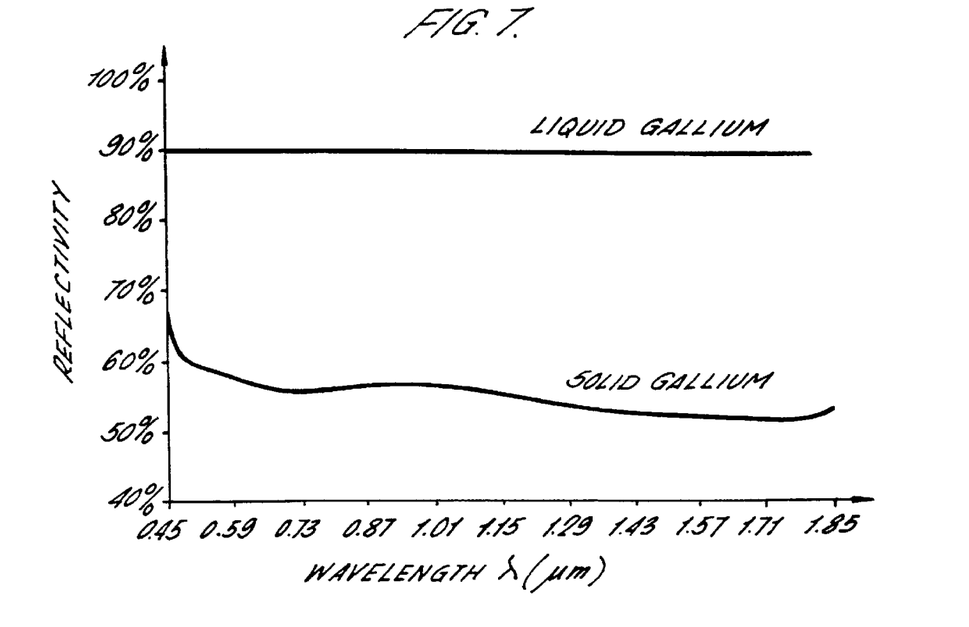
FIG. 7 is a graphical illustration of the variation of the ratio of the reflectivity of solid gallium $R_S$ to that of liquid gallium ($R_L$) over different wavelengths of light.

Importantly, the observed non-linearity in reflection for gallium is a broad band effect. FIG. 7 shows that the non-linearity should extend over wavelengths from 500 nm to more than 1800 nm.

Figure 8:
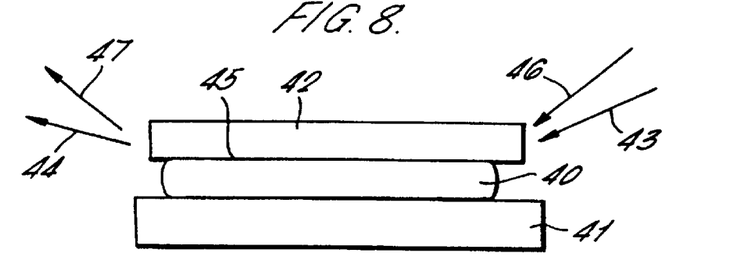
FIG. 8 illustrates an embodiment of the invention employing a planar light waveguide.

FIG. 8 illustrates another construction of the device making use of the variable reflection coefficient of gallium. Here, a bead 40 of gallium is sandwiched between a temperature control plate 41 and a planar waveguide 42. A pump light beam 43 is coupled into the waveguide 42, which may be either a multi mode or a single mode waveguide, and experiences multiple reflections within the planar waveguide, before emerging from the waveguide at 44. The reflection coefficient provided at the interface 45 between the gallium bead 40 and the adjacent face of the waveguide 42 can be adjusted by varying the intensity of the probe beam 43. For short pulse operations, the reflection coefficient will be dependent on the total energy dose per unit area delivered by the probe beam 43.

As a result of adjusting the reflection coefficient at one face of the planar waveguide, the transmission efficiency of the waveguide to a probe beam 46 is varied accordingly so that the probe beam may be modulated, in accordance with variations in the intensity of the probe beam 43, to emerge as a signal beam 47.

Figure 9:
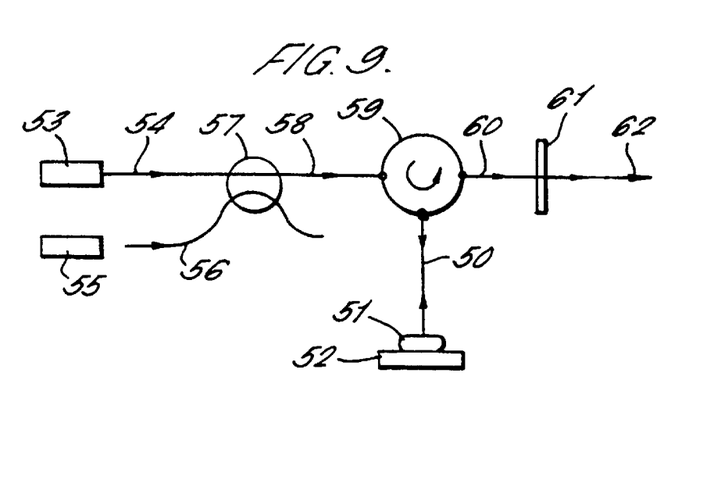
FIG. 9 illustrates apparatus for separating incident and reflected light beams using the apparatus of FIG. 2.

FIG. 9 illustrates an arrangement using an optical fibre interface with a bead a gallium of the kind described with reference to FIG. 2. An optical fibre 50 has one end embedded in a bead of gallium 51 located on a temperature control plate 52. A first laser source 53 delivers pump beam energy at a first wavelength, say 1.57 micron, to an optical fibre 54. A second laser light source 55 delivers probe energy at a second wavelength, say 1.55 micron to an optical fibre 56. The pump energy optical fibre 54 may be relatively high power, say between 1 and 10 mW. The probe energy in fibre 56 may be low power at say 100 $\mu$W. Fibres 54 and 56 are both fed through a 50/50 coupler 57 so that output fibre 58 from the coupler 57 carries 50% of the pump energy from source 53 and 50% of the probe energy from source 55. The combined signal on fibre 58 is fed to a first port of an optical circulator 59 which has a second port connected by the fibre 50 to the gallium bead 51, and a third port connected to an output fibre 60. The optical circulator 59 operates by coupling light energy at the first port for transmission from the second port, and coupling energy received by the second port for transmission from the third port. Thus, the pump and probe energy delivered by the optical coupler 59 to the fibre 50 is reflected in the variable mirror provided by the gallium bead 51 and the combined reflected light energy emerges from the coupler on fibre 60. A spectral filter 61 has a bandwidth of 1 nm, centered on the probe wavelength (1.55 micron), so that only the reflected probe energy is coupled on to the output 62.

Instead of optical circulators, other forms of coupler providing similar functions may be used, such as optical beam splitters or fibre couplers. The term "circulator" used herein should be construed accordingly.

Figure 10:
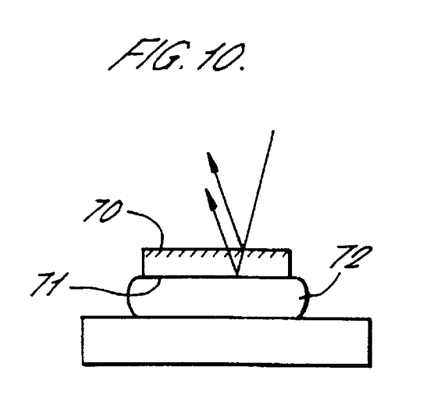
FIGS. 10, 11, 12 and 13 illustrate methods of enhancing contrast in the reflected signal beam.

FIG. 10 illustrates a technique for increasing the contrast in the probe signal modulated by variations in the reflectivity which may be useful, for example, for communication systems applications. The maximum "dynamic range" of the metallic gallium mirror described above is from 50% reflection coefficient to about 90% reflection coefficient, so the maximum change in intensity in the reflected probe signal is from 90% to 50%. As illustrated in FIG. 10, a further partially reflecting surface 70 may be located adjacent and parallel to the reflecting interface 71 of the gallium bead 72. Then the spacing between the reflecting surfaces 70 and 71 and the proportion of light reflected by the additional reflecting surface 70 can be selected in combination with the wavelength of the incident light so that the combined reflected beam experiences substantially full destructive interference, when the reflection coefficient of the gallium interface is at either its lower or upper extremes. Then the effective contrast resulting from the modulation in the reflected beam can approach 100%, although the maximum intensity in the reflected beam is reduced to the maximum difference in reflection coefficient of the gallium interface, say 30% of the incident probe beam intensity.

Figure 11:
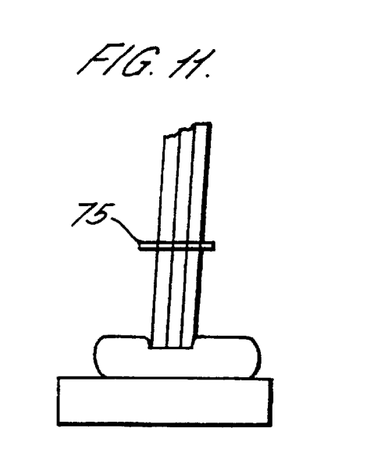

FIG. 11 illustrates a corresponding arrangement for an optical fibre employing a partially reflecting surface or grating 75 at a selected spacing from the gallium interface to provide the required destructive interference in reflected light.

Figure 12:
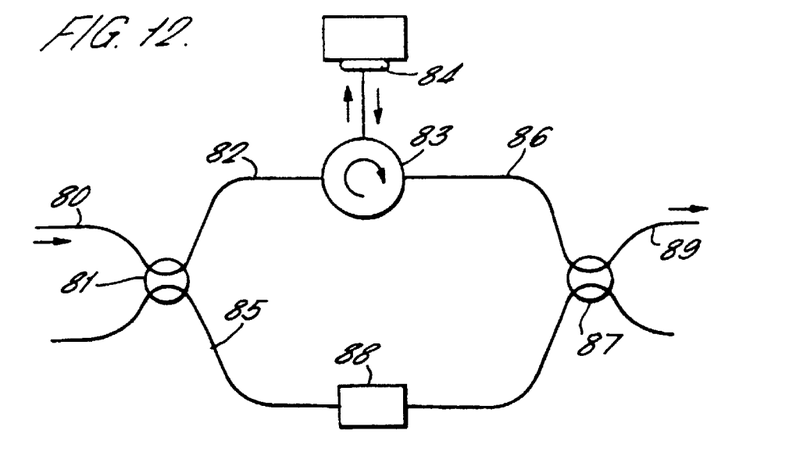

FIG. 12 illustrates a further interferometric arrangement employing optical fibres in which an input light beam on a fibre 80 is split by an optical coupler 81 between a first path 82 supplied to a circulator 83 connected to the gallium mirror 84, and a second path 85. Light reflected from the gallium mirror 84 is communicated by the circulator 83 on fibre 86 to a further optical coupler 87 which also receives the light on fibre 85 via a phase control device 88.

The phase control device 88 is set so that the light energy supplied to the coupler 87 via the gallium mirror 84 is antiphase to the energy supplied directly via the phase controller 88. Then the ratios of the couplers 81 and 87 may be selected so that there is substantially total destructive interference in an output fibre 89 from coupler 87 when the gallium mirror is at one extreme of reflection coefficient. Then the contrast in the output energy on fibre 89 can be about 100%.

Figure 13:
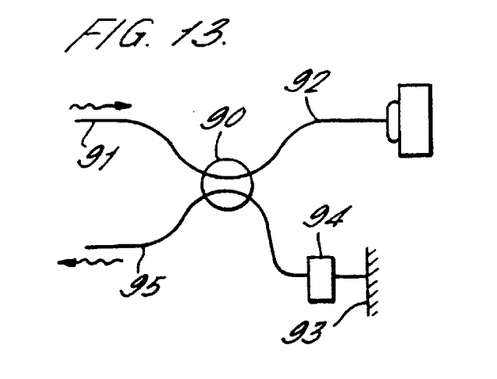

FIG. 13 illustrates a similar arrangement using a single coupler 90 splitting incoming light energy on a fibre 91 to be supplied to the gallium mirror on a fibre 92 and to a further reflector 93 of constant reflection coefficient. A phase control device 94 adjusts the phases in the reflected energies from the two mirrors so as to cancel out when combined by the coupler 90 in an output fibre 95. A similar arrangement can be designed to make use of intensity-dependent polarization changes. Such changes can be induced by one beam of light on another beam of light, or can be self-induced.

Figure 14:
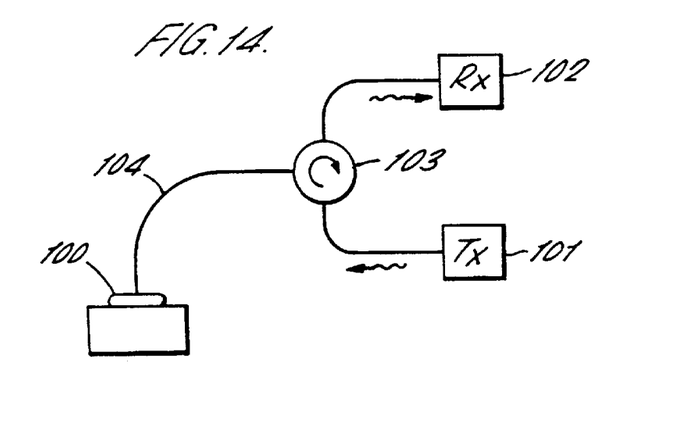
FIG. 14 provides an illustration of various sensor applications of the device.

FIG. 14 illustrates a simple arrangement for separating light energy transmitted to a gallium mirror 100 from a transmitter 101 from light energy reflected back from the gallium mirror and supplied to a receiver 102. For this purpose an optical circulator 103 separates the incident and reflected light energy on the fibre 104 connected to the gallium mirror.

This arrangement may be used as a sensor. The intensity of reflected light received by the receiver 102 is dependent on the reflection coefficient of the gallium mirror 100. This in turn may be used to detect the intensity of light incident on the gallium mirror from some other source (not shown in FIG. 13), the level of other electromagnetic radiation such as microwave or rf incident on the gallium mirror surface, or the strength of an electric or magnetic field in the region of the gallium mirror surface. The sensor may also be used to detect acoustic energy or vibration, as it has been discovered that the reflection coefficient of a gallium interface at temperatures just below the melting point of gallium are highly sensitive to mechanical shocks or acoustic energy.

Figure 15:
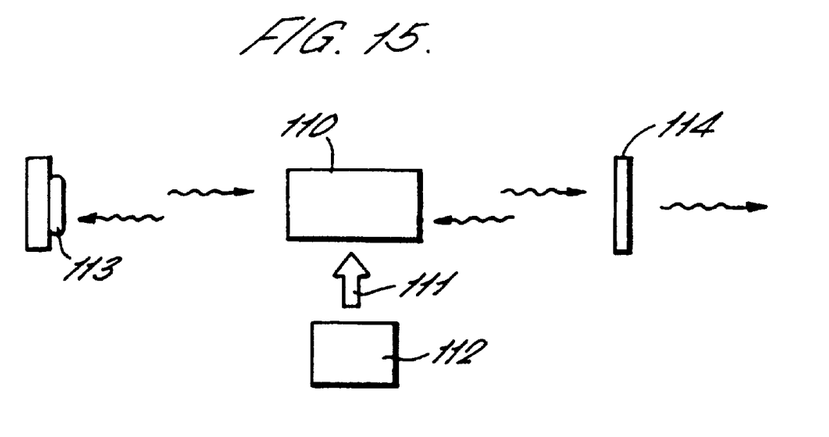
FIG. 15 illustrates application of the variable reflectivity device in a resonant cavity laser.

FIG. 15 illustrates in schematic form, the use of a variable gallium mirror as described above for controlling the resonance of a cavity laser. In FIG. 15, a lasing medium 110 receives pumping energy, represented by the arrow 111 from a pump source 112. A gallium mirror 113 of the kind described above is used as one of the mirrors bounding the resonant cavity of the laser. The cavity is also bounded by a further mirror and output coupler 114.

As the energy states in the lasing medium 110 are progressively inverted by the pumping energy 111, the intensity of light energy emitted by spontaneous emission of electron energy states in the lasing medium 110 increases. Once the intensity due to spontaneous emission is sufficient to increase the reflection coefficient of the gallium mirror 113 above a threshold level, the energy in the resonant cavity between the mirrors 113 and 114 become sufficient to begin stimulated emission from the lasing medium 110. The resulting increase in emissions from the lasing medium cause a very fast increase in the intensity within the cavity fully "switching" the gallium mirror 113 so that a rapid pulse of laser energy is emitted through the coupler 114. Accordingly, the laser is Q-switched to produce repeated relatively intense laser pulses.

A similar arrangement may also be employed for mode locking, providing the fast component of the nonlinearity is used. Moreover such an arrangement may be used to stabilize the repetition rate of a mode-locked laser, where the mode-locking mechanism is provided by some other means, such as passive mode-locking, for example Kerr-mode locking, or active mode-locking.

Other types of laser, such as diode, glass, gas, liquid and crystal (solid state) lasers may also be Q-switched, stabilised and/or mode locked using such mirrors.

Figure 16:
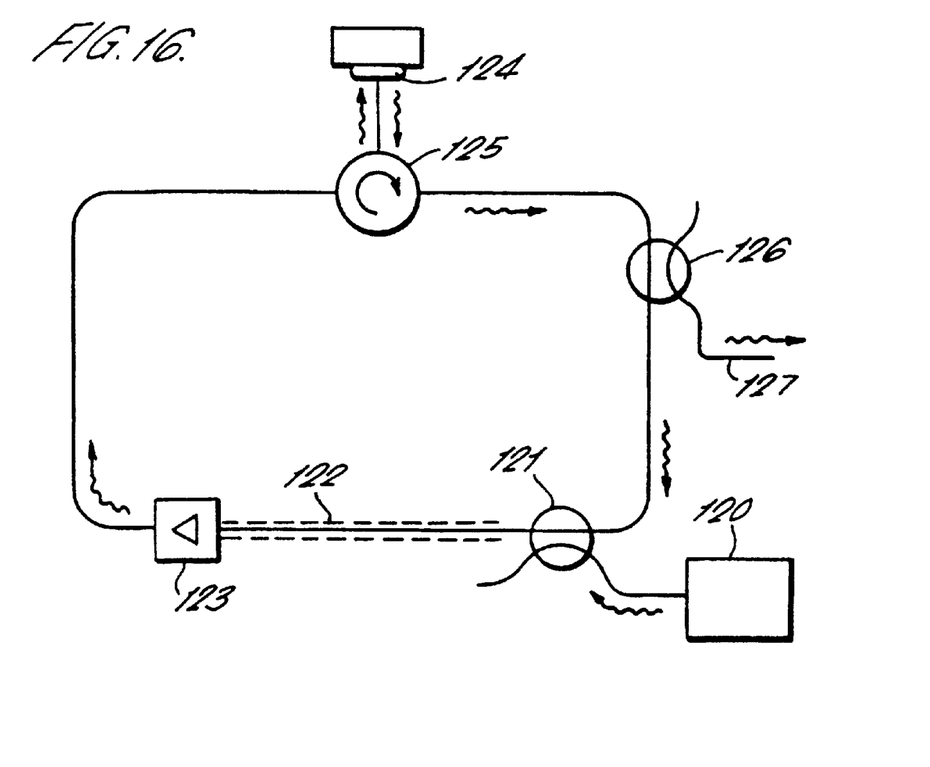
FIG. 16 illustrates application of the variable reflectivity device in an optical fibre laser connected in a resonant fibre ring.

FIG. 16 illustrates an arrangement for Q-switching or mode-locking an optical fibre laser in a resonant fibre ring. Pump energy from a pump source 120 is coupled into the ring by a coupler 121 to produce a population inversion in the energy states of a doped optical fibre 122. An isolator 123 ensures light circulates around the ring in one direction only. The fibre 122 may be doped with $Er^{3+}/Yb^{3+}$ or any other rare earth, and the pump source may be a Nd:YLF laser producing radiation at 1047 nm or any other optical source producing optical energy at a suitable wavelength.

Light produced by spontaneous emission in the doped fibre 122 passes through the isolator 123 and is reflected in a gallium mirror 124 connected into the ring by a circulator 125. Reflected energy travels on round the ring back to the doped fibre 122. The total length of the optical path provided by the fibre ring and the connection to the gallium mirror 124 is selected to provide resonance in a number of possible modes of operation of the laser.

As before, once the energy of circulating radiation reaches an intensity such as to increase the reflection coefficient of the mirror 124, stimulated emission in the doped fibre 122 is increased, causing a rapid increase in energy in the ring with consequent complete switching of the gallium mirror 124. An output coupler 126 communicates the resulting pulse of laser energy on an output fibre 127. Once again this construction may be used for mode-locking.

At temperatures below the gallium melting point and at low pump powers typically below ~200 mW the laser operated in a cw mode. However, between certain well defined (but temperature dependent) pump power limits the laser entered a stable Q-switch regime. At still higher powers instabilities became apparent. The pulse duration was always in the range 1–2 ps. The pulse repetition rates were between 20 and 100 KHz, the exact repetition rate being dependent on pump power and sample temperature.

Figure 17:
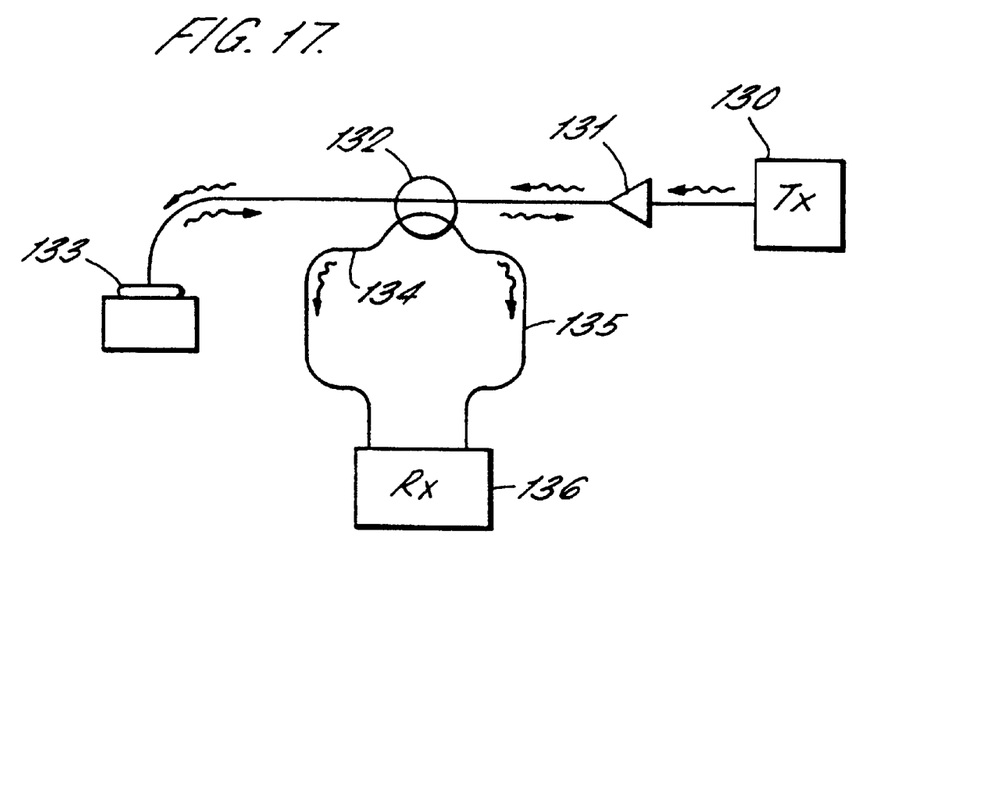
FIG. 17 illustrates a further sensing application.

FIG. 17 illustrates a further arrangement similar to that illustrated in FIG. 14, enabling the reflected beam from a gallium mirror to be separated from the transmitted signal and passed to a receiver for analysis. In this example, a transmitted signal from a transmitter 130 is fed by an optical fibre via an isolator 131 and a coupler 132 to the gallium mirror 133. The coupler 132 couples a proportion of the transmitted signal on a first fibre 134 and a proportion of the reflected signal on a second fibre 135, both to a receiver 136. The receiver 136 is thus able to compare the reflected signal on fibre 135 directly with the transmitted signal on fibre 134. The isolator 131 absorbs the proportion of the reflected signal transmitted from the coupler 132 back towards the transmitter 130.

Figure 18:
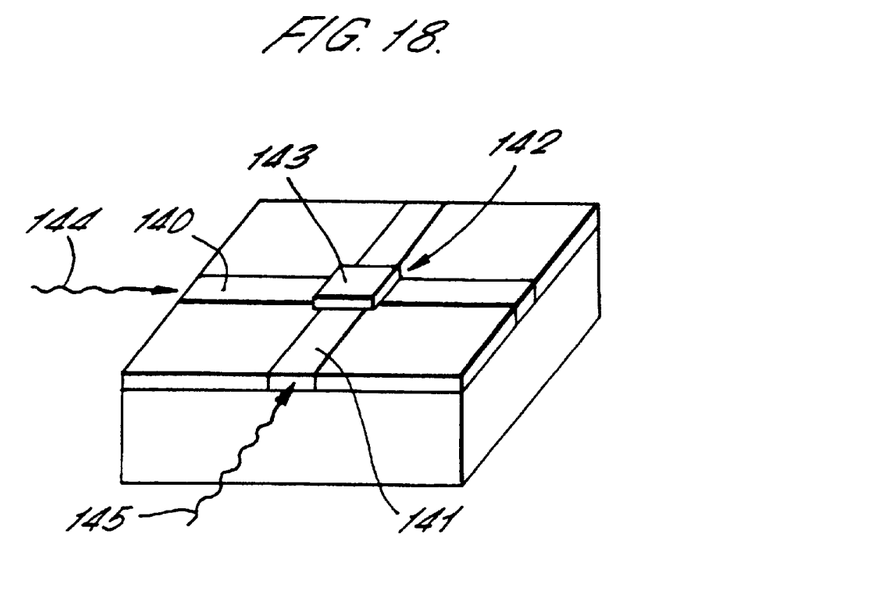
FIG. 18 illustrates a further embodiment of the invention employing planar optical waveguides.

FIG. 18 illustrates an embodiment employing planar optical waveguides. First and second planar optical waveguides 140 and 141 intersect at a location 142. A body 143 of gallium metal is deposited on the exposed surfaces of the waveguides 140 and 141 at the point of intersection 142. As a result, the transmission efficiency of a low energy light signal 144 in waveguide 140, can be varied by adjusting the intensity of a high energy signal 145 in waveguide 141.

The variable reflection coefficient properties described above may also be used in a two dimensional array of controllable mirrors, or an extensive planar mirror. The reflection coefficient of the mirrors of a two dimensional array may be individually controlled by the application of incident light beams of varying intensity, to provide thereby an optical medium for storing data or for providing a required image in the light reflected by the array.

Instead of an array of discrete mirrors, a single extensive mirror surface may be formed. Then, the spatial distribution of reflection coefficient in the mirror may be controlled by illuminating the mirror with a correspondingly spatially modulated light source.

In the above examples, the reflection coefficient of the mirror has been controlled by the intensity or dose per unit area of incident light. The reflection coefficient may also be controlled by the application of non-radiating electric or magnetic fields, or by the application of acoustic or vibrational energy.

Figure 19:
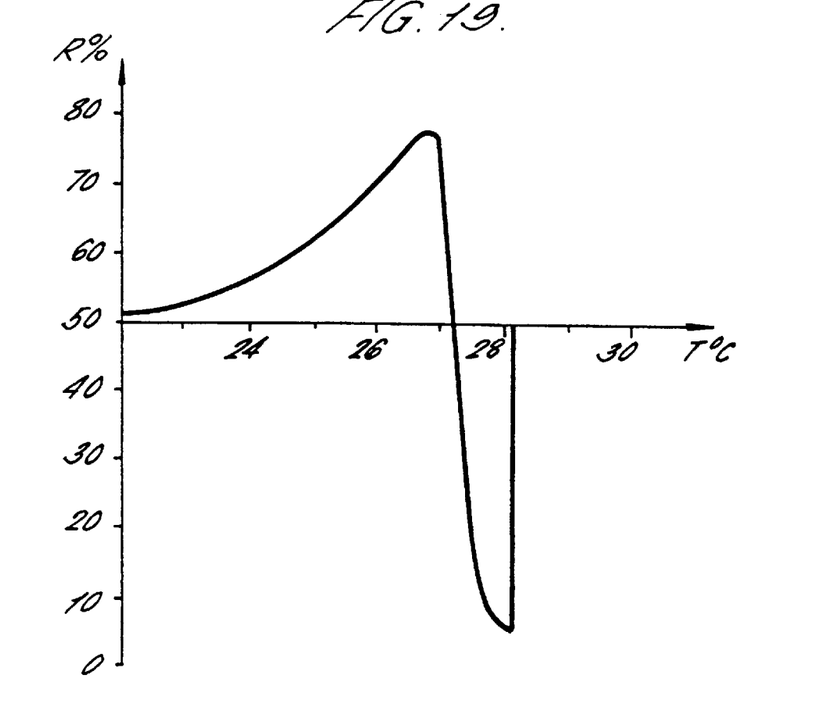
FIG. 19 is a graphical illustration of the variation in reflection coefficient with temperature for gallium.

FIG. 19 is a graphical representation similar to that of FIG. 3 but representing the coefficient of reflection (R%) for different temperatures of gallium. This representation shows that for temperatures just (less than 1° C.) below the melting point, the reflection coefficient at a gallium interface exposed to a suitably intense electromagnetic field falls below the value, about 50%, for cold gallium. In fact the reflection coefficient in this regime can fall to almost zero at temperatures about 0.5° below melting point when exposed to sufficient light intensity for a sufficient period of time.

Figure 20:
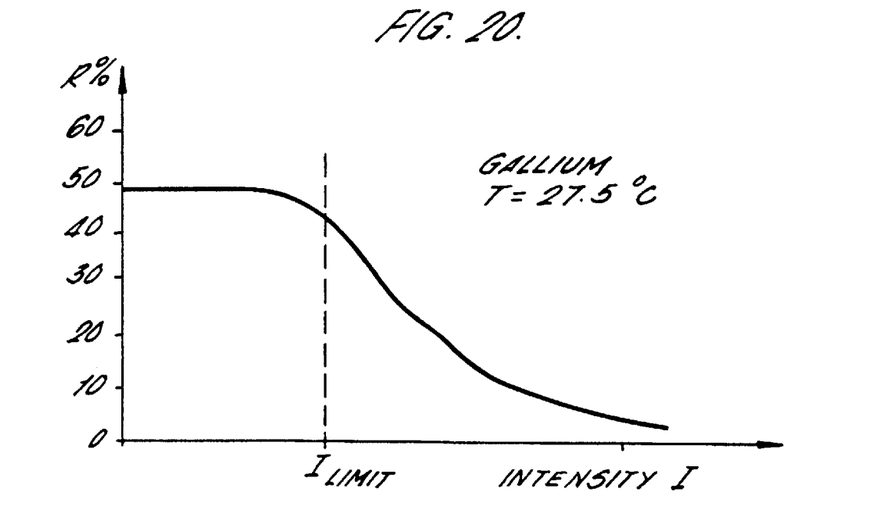
FIG. 20 is a graphical illustration of the variation in reflection coefficient with incident radiation intensity at a temperature of about 27.5° C.

This phenomenon is further illustrated in FIG. 20 which is a plot of the reflection coefficient R% against intensity of incident radiation for gallium held at a temperature of 27.5° C. In these experiments, the gallium was found to melt at a measured temperature of about 28° C. As illustrated in FIG. 20, the reflection coefficient begins to fall from the value of 50% once the intensity of incident light exceeds a threshold value $I_{limit}$. The reflection coefficient falls to almost zero for sufficient levels of intensity of incident radiation.

A gallium mirror held at a temperature just below melting to provide a negative change in reflection coefficient with increasing intensity can be used as an optical limiter, or for reducing optical noise. The reducing level of reflection coefficient with increasing applied intensity has the effect of limiting the maximum intensity of reflected light from the gallium mirror.

For noise reducing purposes, if the applied light intensity is at a level exceeding $I_{limit}$, noise in the form of variations in the intensity of applied radiation with time, will be proportionately reduced in the light reflected from the gallium mirror. Such noise-reducing mirrors may be used within a laser cavity to reduce laser amplitude or phase noise.

Figure 21:
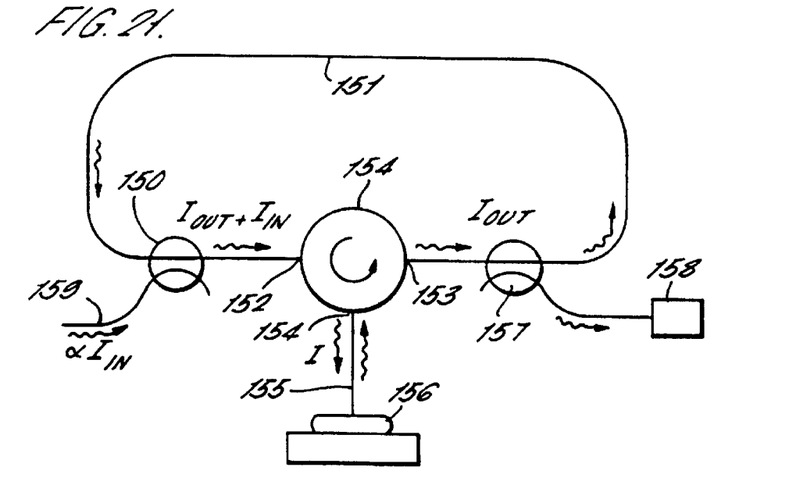
FIG. 21 illustrates a further embodiment of the invention exhibiting optical bistability.

The variable reflecting mirror can be used to form bi-stable devices. In FIG. 21, input energy is coupled by a coupler 150 to a fibre loop 151 interconnecting an input port 152 and an output port 153 of an optical circulator 154. Energy received by the input port 152 is communicated via a third port 154 and a fibre 155 to a gallium mirror 156. Energy reflected by the mirror is communicated from the port 154 to the output port 153. An output coupler 157 couples a very small proportion of the energy in the loop 151 to a detector 158.

If the energy from the output port 153 is $I_{out}$, and assuming only a very small proportion of this energy is lost in the couplers 157 and 150, then the energy at the input port 152 is $I_{out}+I_{in}$, where $I_{in}$ is proportional to the input energy supplied to the system on input fibre 159.

Since the energy I supplied from the port 154 to the gallium mirror 156 equals $I_{in}+I_{out}$, and $I_{out}$ equals $R(I) \cdot I$, where $R(I)$ is the coefficient of reflection of the gallium mirror 156, $$I_{in}=[1-R(I)] \cdot I.$$

Figure 22:
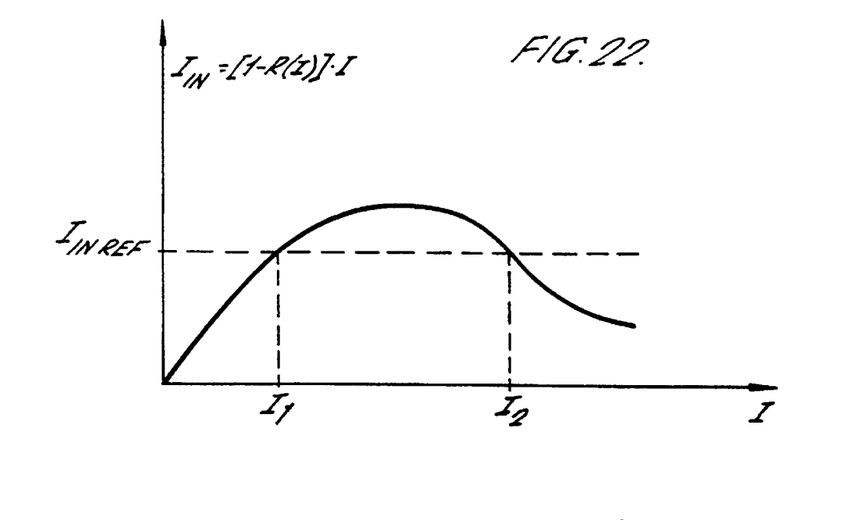
FIG. 22 is a graphical illustration of the bistability of the arrangement of FIG. 20.

Since for a gallium mirror, $R(I)$ has a shape as illustrated in FIG. 4, the relationship between $I_{in}$ and I will be as illustrated in FIG. 22. This curve shows that there are a range of values of $I_{in}$, which correspond to two possible values of I, illustrated in FIG. 22 as $I_1$ and $I_2$. Accordingly, the arrangement illustrated in FIG. 21 exhibits bi-stability. If the resting level of $I_{in}$ is $I_{inref}$ (corresponding to some higher value of intensity supplied on line 159 proportionate to $I_{inref}$), the arrangement may be switched from the low state in which I equals $I_1$ to the high state in which I equals $I_2$, by applying a higher energy pulse on line 159. The arrangement will then remain in the higher state until switched to the lower state by a brief interruption in the application of $I_{inref}$.

The state of the bi-stable device can be monitored by monitoring the intensity level in the loop 151 by means of the detector 158.

Similar bi-stable devices may be formed by using an additional partially reflecting mirror parallel to the gallium mirror to form a Fabry-Perot resonator or etalon or other form of interferometer. Suitable selection of the coefficient of reflection of the additional mirror will produce a region of bi-stability in which the intensity of energy between the two mirrors, and hence the intensity of the net energy reflected from the combined mirrors, may take two different values for the same input energy. Bi-stable devices of this kind may be formed using constructions similar to those illustrated in FIGS. 10 and 11.

Figure 23:
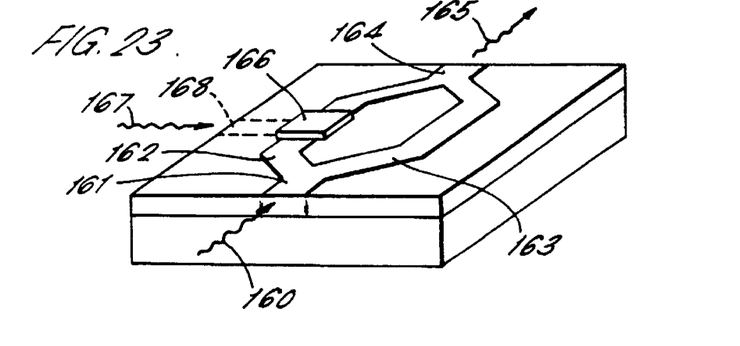
FIG. 23 illustrates another embodiment of the invention employing planar waveguides.

FIG. 23 illustrates a planar integrated variant of the fibre interferometer illustrated in FIG. 12. Light 160 in an input optical waveguide 161 is split between branching waveguide sections 162 and 163, and then recombined for onward transmission in output waveguide 164. The phasing of the combining light is adjusted to provide destructive interference in the continuing light 165 in the output waveguide 164. A non-linear reflecting element 166 comprising a body of gallium close to its melting point is located on one branching waveguide section 162, so that the intensity of light from this branch recombining in the onward light 165 is dependent on the reflectivity of the element 166. In this way, up to 100% modulation (or switching) of the continuing light intensity may be achieved, in response to variations in the intensity of the input light 160.

As an alternative, the output light 165 may be modulated or switched in response to a control light source 167 supplied to the element 166 on a control waveguide 168.

Instead of operating as a modulator or switch, the device of FIG. 23 may also operate as a bistable device by including partially reflecting mirrors or gratings on each side of the element 166 in the waveguide branch 162.

The device of FIG. 23 may also be operated to control polarisation of the combining light, instead of, or as well as intensity.

The embodiments of the invention described above employ high purity metallic gallium maintained at a temperature just below the melting point to provide a non-linear coefficient of reflection. Other materials may be employed for the body of non-linear material providing the reflecting interface. To be useful the material used must have the following characteristics:

A melting point below 400° C. and preferably below about 150° C.

The material must exhibit a substantial non-linearity in light reflected from an interface formed by the material, while the material is maintained at a temperature close to but below the melting point of the material.

The level of non-linearity should enable changes in reflection coefficient of at least 1% in response to an intensity or a dose of electromagnetic radiation at an intensity and for a time below the dose or intensity which would cause irreversible structure damage or irreversible changes to the non-linear material, the covering transparent material or the interface between them.

The reaction of the material to the applied electromagnetic radiation must be relatively fast, so that the required change in reflection coefficient occurs within 1 mSec of application.

The change in reflection coefficient must be reversible so that the original reflection coefficient is restored within 1 mSec of removal of the applied radiation.

Materials which exhibit these essential characteristics may be discovered empirically. Appropriate materials may include the low melting point metals such as antimony, mercury, lead and tin. The materials may also include alloys or compositions particularly of gallium. A desirable alloy of gallium would exhibit the non-linearity in reflection coefficient of pure metallic gallium, but would have a melting point rather higher than metallic gallium, so that temperature control of the material could be maintained using only a heat source, rather than both heat and cooling sources.

Although pure gallium has been disclosed as an especially suitable material, it should be understood that some surface impurity in the gallium may be tolerated or even be advantageous in some circumstances.

There follows a list of some general descriptions of methods, devices and apparatus using or incorporating variable reflecting surfaces, which are encompassed by the present invention.

A method of modulating light comprising the steps of forming a reflecting surface at an interface between an optically transparent region and a body of the material described, directing light to be modulated through the transparent region at the reflecting surface, and stimulating the material at the interface to change the reflectance of the reflecting surface to the light from the light source while holding the body at a fixed temperature below the melting point, whereby to modulate light from the source reflected in the reflecting surface.

A Q-switched laser employing a variable reflecting surface as described as one of the mirrors forming the resonant cavity of the laser.

A mode locked laser as above.

An optical fibre laser employing a variable reflectivity mirror as described to optimise the modes circulating in the optical fibre resonant ring of the laser to those having a higher intensity, thereby causing the optical fibre laser to be mode locked, or to be Q-switched.

An active optical device comprising a broad band reflecting interface formed between a transparent solid material and a body of material comprising gallium at a temperature between the melting point of the material and 25° C. below the melting point.

Apparatus providing variable reflectivity to electromagnetic radiation, comprising a region which is transparent to the radiation, and a body of predetermined material forming an interface with said transparent region to provide a broad band external reflecting surface, said material exhibiting, when below its bulk melting point, a structural phase transition at said interface in response to electromagnetic radiation incident on said reflecting surface. The phase transition may be melting or a transition to a more metallic solid phase of the material. Thus suitable materials may be metals or metallic like materials which exhibit surface melting and/or which have covalent bonds which may be broken or effected by the incident radiation.

What is claimed is:

1. Apparatus providing variable reflectivity to electromagnetic radiation, comprising a region which is transparent to the radiation, and a solid body of predetermined inorganic material forming an interface with said transparent region to provide a broad band external reflecting surface, said predetermined material exhibiting optical non-linearity at least at a predetermined temperature close to the melting point of the material, wherein said predetermined material exhibits in said radiation reflected by said surface a change of not less than 0.001 percent in at least one component of the dielectric tensor of the material when exposed to electromagnetic radiation of an intensity 5 kW/cm$^2$ delivered for less than 1 ms, the initial value of said component being restored within 1 ms of termination of delivery of said electromagnetic radiation.

2. Apparatus as claimed in claim 1 including a temperature controller to hold said body at said predetermined temperature, and means to stimulate said material at said interface to effect a reversible change in a component of the dielectric tensor of the material at said predetermined temperature.

3. Apparatus as claimed in claim 1, wherein said predetermined material exhibits a change in coefficient of reflection at said interface of not less than 0.01 (1%) in response to an applied intensity of electromagnetic radiation of 5 kW/cm$^2$.

4. Apparatus as claimed in claim 1, wherein said predetermined material exhibits a change in coefficient of reflection at said interface of not less than 0.01 (1%) in response to an applied dose of electromagnetic radiation of 20 Joule/m$^2$.

5. Apparatus as claimed in claim 3, wherein the predetermined material exhibits a change in coefficient of reflection at said interface of not less than 0.05 (5%) in response to an applied intensity of electromagnetic radiation of 5 kW/cm$^2$.

6. Apparatus as claimed in claim 1 wherein said predetermined material is selected from metallic gallium, amorphous gallium, dielectric and semiconductor host materials doped with gallium microparticles, clusters of gallium on solid surface gallium alloys and multi-layered structures with other materials, gallium doped with other chemical elements, bismuth, cadmium, antimony, selenium, mercury, lead, tin, zinc and alloys and compositions containing at least one of gallium, mercury, bismuth, cadmium, antimony, germanium selenium, lead tin, indium, zinc, germanium, manganese, nickel, and having a melting point below 400° C.

7. Apparatus as claimed in claim 6, wherein said predetermined material comprises gallium.

8. Apparatus as claimed in claim 1 wherein said transparent region comprises a transparent non-gaseous substance forming said interface with said body.

9. Apparatus as claimed in claim 8, wherein said transparent region comprises a layer of said transparent substance.

10. Apparatus as claimed in claim 8, wherein said transparent region comprises an end portion of an optical fibre having an end face forming said interface.

11. Apparatus as claimed in claim 8, wherein said transparent region comprises an optical waveguide having a side wall forming said interface.

12. Apparatus as claimed in claim 1 including a second reflecting surface to form, with said broad band reflecting surface, an interferometric arrangement.

13. Apparatus as claimed in claim 1, including a first optical path incorporating said broad band reflecting surface, and a second optical path, said paths forming an interferometric arrangement.

14. Apparatus as claimed in claim 1, including means defining an interferometric arrangement between first and second polarization modes, energy in one of said modes being reflected in said broad band reflecting surface.

15. Apparatus as claimed in claim 1, including a waveguide and means defining an interferometric arrangement between first and second waveguide modes for light energy conducted by said waveguide, energy in one of said waveguide modes being reflected in said broad band reflecting surface.

16. Apparatus as claimed in claim 1, including
(a) a circulator device having at least first and second ports, and adapted to direct electromagnetic radiation received at the first port for reflection in said broad band reflecting surface and to direct electromagnetic radiation reflected in said surface for transmission from the second port,
(b) a feedback transmission path feeding radiation transmitted from the second port back to the first port,
(c) an input coupler for coupling input electromagnetic radiation into said first port, and
(d) an output coupler for coupling output electromagnetic radiation from the second port.

17. Apparatus as claimed in claim 1, including a coupler adapted for coupling to a common portion at least of said broad band reflecting surface
(a) a control source of electromagnetic radiation for controlling changes in the coefficient of reflection of said surface resulting from changes in a component of the dielectric tensor of said predetermined material due to the electric field of said control source, and
(b) a signal source of electromagnetic radiation,
(c) said coupler being adapted also for receiving electromagnetic radiation from said signal source reflected by said common portion of said surface.

18. Laser apparatus having a resonant optical arrangement including a mirror comprising the reflecting surface of apparatus as claimed in claim 1.

19. Apparatus providing variable reflectivity to electromagnetic radiation, comprising a region which is transparent to the radiation, and a body of predetermined material forming an interface with said transparent region to provide a broad band external reflecting surface, said material having a melting point below 400° C. and exhibiting, when not more than about 40° C. below its bulk melting point, a structural phase transition at said interface in response to electromagnetic radiation incident on said reflecting surface, said phase transition occurring over at least a portion of the irradiated material.

20. Apparatus as claimed in claim 19, wherein said predetermined material is one which exhibits surface melting when below its bulk melting point, or is thermodynamically close to surface melting.

21. Apparatus as claimed in claim 20, wherein said surface melting occurs in a surface layer of the material having a thickness which increases in response to incident radiation.

22. Apparatus as claimed in claim 19, wherein said material exhibits a transition to a more optically reflecting solid phase in response to said incident radiation.

23. Apparatus as claimed in claim 22, wherein said transition occurs in a surface layer of the material having a thickness which increases in response to incident radiation.

24. Apparatus as claimed in claim 19, wherein said material is selected from the group comprising Bi, Zn, Cd, Ga, In, Pb, Sn, Tl and Sb, alloys of these elements, and compositions containing any of said elements.

25. Apparatus providing variable reflectivity to electromagnetic radiation, comprising a solid body of gallium arranged to provide an external reflecting surface, and a temperature controller arranged to hold the body of gallium at a constant temperature selected to be between −10° and +30° C. and below the bulk melting point of said body.

26. Apparatus as claimed in claim 25 including means to apply a predetermined stimulation to said gallium at least at a predetermined location on said reflecting surface to effect a change in the coefficient of reflection at said stimulated location, said change in coefficient being reversible on removal of said stimulation.

27. Apparatus as claimed in claim 26 wherein said predetermined stimulation is heat energy and said means to apply is arranged to apply said heat energy to a selected said location only on said reflecting surface whereby the temperature of the gallium body as a whole is not substantially altered from said constant temperature.

28. Apparatus as claimed in claim 26, wherein said predetermined stimulation is radiant electromagnetic energy.

29. A method of providing a variable reflecting surface, comprising the steps of providing a solid body of gallium having an external reflecting surface, maintaining the gallium body at between 20° and 30° C. and below the bulk melting point, and stimulating the gallium at least at a predetermined location on said reflecting surface, without raising the temperature of the gallium body above the bulk melting point, to induce a change in the coefficient of reflection at said stimulated location.

30. A method as claimed in claim 29, wherein the gallium is stimulated by irradiating with electromagnetic energy.

* * * * *